R. J. HALE AND W. T. DOYLE.
AUTOMATIC LOCK.
APPLICATION FILED FEB. 2, 1920.

1,375,386.

Patented Apr. 19, 1921.

WITNESS:

INVENTOR.
R. J. HALE & W. T. DOYLE
BY
ATTORNEY.

UNITED STATES PATENT OFFICE.

ROBERT J. HALE AND WILLIAM T. DOYLE, OF LEXINGTON, KENTUCKY, ASSIGNORS OF FORTY-FIVE PER CENT. TO SAID HALE, ONE-TENTH TO JAMES A. WILMORE AND FRED. H. RYAN, AND FORTY-FIVE PER CENT. TO CARRIE DOYLE, ALL OF LEXINGTON, KENTUCKY.

AUTOMOBILE-LOCK.

1,375,386.  Specification of Letters Patent.  Patented Apr. 19, 1921.

Application filed February 2, 1920. Serial No. 355,847.

*To all whom it may concern:*

Be it known that we, ROBERT J. HALE and WILLIAM T. DOYLE, citizens of the United States, residing at Lexington, in the county of Fayette and State of Kentucky, have invented certain new and useful Improvements in Automobile-Locks; and we do hereby declare the following to be a full, clear, and exact description of the invention, such as will enable others skilled in the art to which it appertains to make and use the same.

The present invention relates to locks, and more particularly to locks for use on automobiles, and similar machines, for locking a shaft or similar member which is movable within a casing or the like.

In its more specific application, the invention has for its object the provision of means for locking the steering column of an automobile, whereby to prevent the turning of the front wheels for steering the vehicle, thereby preventing the theft of the machine, and the wheels can be locked when turned to an angle so that the machine can not travel straight ahead.

Another object is the provision of a plunger bolt adapted to be moved manually into engagement with shaft or member to prevent movement thereof, which is automatically locked in such position, until released by the aid of proper key, and the construction involves a novel assemblage and arrangement of the component elements for carrying out the intended results.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1:
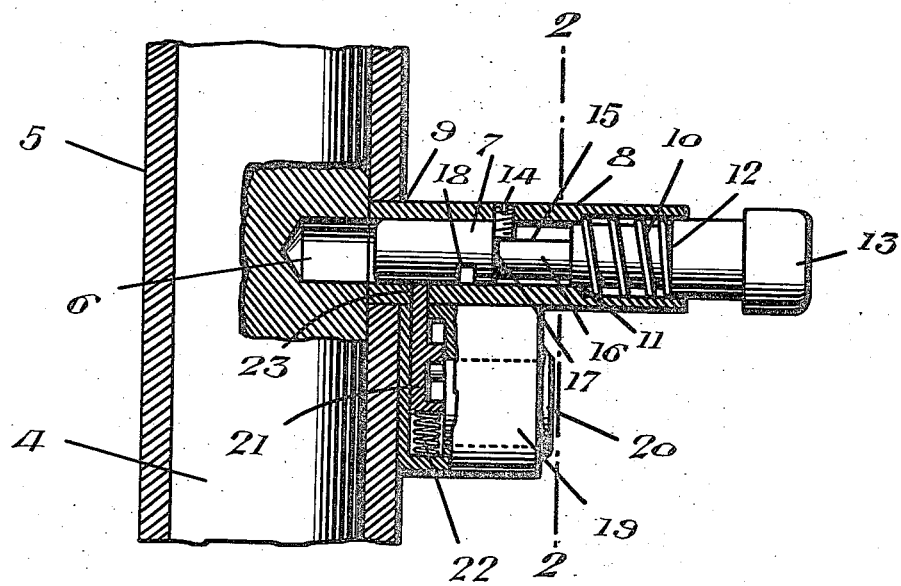
Figure 1 is a view of the lock, portions being shown in elevation and others in section.
Figure 2:
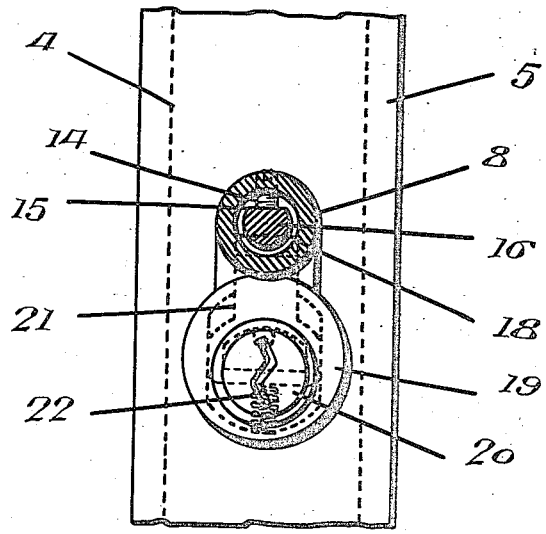
Fig. 2 is a section on the line 2—2 of Fig. 1.

The lock is intended for locking a shaft 4 which turns or moves within a casing 5, such as the steering shaft of a steering column of an automobile, whereby to prevent said shaft from being turned for steering the vehicle.

In carrying out the invention, the shaft or member 4 is provided with a recess or socket 6, for the reception of a plunger bolt 7, which is slidable within a tubular casing 8, having its inner end suitably secured within an opening 9 provided in the casing 5 so that the recess 6 registers with the bolt when the shaft 4 is moved or turned to the position in which it is to be locked.

The plunger bolt is automatically retracted from the shaft 4 and released, by means of a coiled expansion spring 10 surrounding said bolt within the casing 8 and confined between a shoulder 11 in the casing and a shoulder 12 on the bolt. This spring in expanding tends to move the bolt outwardly to withdraw it form the recess 6, and the outer end of the bolt has a button 13 for conveniently sliding the bolt inwardly by hand so as to enter the recess.

The outward movement of the bolt is limited and it is prevented from turning by means of a screw 14 or its equivalent engaged within the casing 8 and bearing against a flat side 15 of a reduced portion 16 of the bolt, thereby preventing the bolt from turning, and said reduced portion provides a shoulder 17 seatable outwardly against said screw or stop 14 to thereby limit the outward movement of the bolt. The bolt 7 has a transverse slot or notch 18 for the engagement of a key-operated locking device which is enclosed within a casing 19 that is secured to the casing 5 and casing 8 in any suitable manner. The casing 19 has a barrel 20 or other key-receiving means, and a key-operated bolt 21 which can be retracted by insertion of a proper key. The bolt 21 is projected by means of a suitable spring 22, and extends toward the casing 8 and through a slot 23 in said casing. The spring 22 tends to project the bolt 21, thereby moving it against the plunger bolt 7, so that when plunger bolt is moved by hand into engagement with the shaft 4, the bolt 21 will automatically snap into the slot or notch 18, thereby locking the bolt 7 and preventing disengagement thereof from the shaft 4. This will prevent the shaft 4 from being moved, thereby securely locking the machine and preventing theft thereof. By the insertion of a proper key and turning thereof, the bolt 21 can be retracted, and the bolt 7 being released, will result in the spring 10 coming into play for retracting said bolt 7 from the shaft 4. Thus, to lock the shaft 4, it is only necessary to push the plunger bolt as when leaving the car, and the insertion and movement of the key will automatically release said plunger bolt, providing a convenient arrangement.

Having thus described the invention, what is claimed as new is:—

A lock comprising a tubular casing, a plunger bolt slidable therein and having one end projecting therefrom for manual operation to project said bolt at its other end from the casing, said casing and bolt having shoulders within the casing, a coiled spring surrounding the bolt and confined between said shoulders for retracting said bolt, said bolt having a reduced portion with a flat side, the member carried by said casing and bearing against said flat side to prevent the bolt from turning and to limit the movement thereof by said spring, said casing having a slot and the bolt having a notch to register with said slot, a second casing secured to the tubular casing, and a spring-pressed key controlled bolt within the second casing slidable at an angle to the plunger bolt within said slot to bear against the plunger bolt and snap into said notch when the plunger bolt is projected.

In testimony whereof we have signed our names to this specification in the presence of two subscribing witnesses.

ROBERT J. HALE.
WILLIAM T. DOYLE.

Witnesses:
  THOS. H. RYAN,
  JAMES A. WILMORE.